(12) United States Patent
Wang et al.

(10) Patent No.: US 12,723,926 B2
(45) Date of Patent: Sep. 1, 2026

(54) HOUSING ASSEMBLY, COMPRESSOR, AND AIR CONDITIONER

(71) Applicants: GUANGDONG MEIZHI PRECISION MANUFACTURING CO., LTD., Foshan (CN); GUANGDONG MEIZHI COMPRESSOR CO., LTD., Foshan (CN)

(72) Inventors: Yiqiang Wang, Foshan (CN); Fenggang Fan, Foshan (CN)

(73) Assignees: GUANGDONG MEIZHI PRECISION MANUFACTURING CO., LTD., Foshan (CN); GUANGDONG MEIZHI COMPRESSOR CO., LTD., Foshan (CN)

( * ) Notice: Subject to any disclaimer, the term of this patent is extended or adjusted under 35 U.S.C. 154(b) by 343 days.

(21) Appl. No.: 18/374,187

(22) Filed: Sep. 28, 2023

(65) Prior Publication Data

US 2024/0027280 A1 Jan. 25, 2024

Related U.S. Application Data

(63) Continuation of application No. PCT/CN2022/080955, filed on Mar. 15, 2022.

(30) Foreign Application Priority Data

Dec. 9, 2021 (CN) ......................... 202111499444.0
Dec. 9, 2021 (CN) ......................... 202123086550.4

(51) Int. Cl.
*G01K 1/14* (2021.01)
*F24F 1/56* (2011.01)

(52) U.S. Cl.
CPC .................. *G01K 1/14* (2013.01); *F24F 1/56* (2013.01); *G01K 2201/00* (2013.01)

(58) Field of Classification Search
CPC ......... G01K 1/14; G01K 2201/00; F24F 1/56; F04B 39/121; F04B 2201/0403; F04B 39/12; F04B 39/14; F04B 51/00
See application file for complete search history.

(56) References Cited

U.S. PATENT DOCUMENTS

2016/0017886 A1 1/2016 Milliff et al.
2016/0231008 A1* 8/2016 Park .......................... F24F 1/16

(Continued)

FOREIGN PATENT DOCUMENTS

CN 203404870 U * 1/2014
CN 206338771 U * 7/2017

(Continued)

OTHER PUBLICATIONS

International Search Report dated Jul. 28, 2022 issued in PCT/CN2022/080955.

(Continued)

*Primary Examiner* — John E Breene
*Assistant Examiner* — Janice M Soto
(74) *Attorney, Agent, or Firm* — K&L Gates LLP

(57) ABSTRACT

A housing assembly, a compressor and an air conditioner are provided. The housing assembly has a housing, a temperature sensor and a fixing bracket. The temperature sensor abuts an outer wall of the housing. The fixing bracket has a fixing portion and connection portions located on two sides of the fixing portion. The connection portions are fixedly connected to the housing. A mounting cavity is formed between the fixing portion and the housing. The temperature sensor is located in the mounting cavity. The fixing portion has a top plate and side plates connected to two sides of the (Continued)

top plate. An angle formed between the top plate and each of the side plates is an obtuse angle. Each of the top plate and the side plates abuts the temperature sensor.

16 Claims, 8 Drawing Sheets

(56) References Cited

U.S. PATENT DOCUMENTS

| | | | | |
|---|---|---|---|---|
| 2017/0346241 | A1* | 11/2017 | Casses | G01K 1/14 |
| 2020/0011740 | A1* | 1/2020 | Mohammad | F25B 49/02 |

FOREIGN PATENT DOCUMENTS

| | | | | |
|---|---|---|---|---|
| CN | 112414572 | A | 2/2021 | |
| CN | 212618822 | U | 2/2021 | |
| CN | 113107833 | A | 7/2021 | |
| CN | 113482881 | A | 10/2021 | |
| CN | 114046240 | A | 2/2022 | |
| CN | 114135469 | A | 3/2022 | |
| CN | 216407108 | U | 4/2022 | |
| CN | 216407109 | U | 4/2022 | |
| JP | 2002188571 | A | 7/2002 | |
| JP | 2008075475 | A | 4/2008 | |
| JP | 2009097361 | A | 5/2009 | |
| JP | 2020002926 | A | 1/2020 | |
| KR | 200164362 | Y1 | 2/2000 | |
| KR | 20020008275 | A | 1/2002 | |
| WO | WO-2021124474 | A1 * | 6/2021 | F24F 11/30 |
| WO | 2021214827 | A1 | 10/2021 | |

OTHER PUBLICATIONS

First Office Action dated Dec. 8, 2024 received in Chinese Patent Application No. CN 202111499444.0.

Second Office Action dated Apr. 7, 2025 received in Chinese Patent Application No. 202111499444.0.

Notification to Grant Patent Right for Invention dated Jun. 2, 2025 received in Chinese Patent Application No. 202111499444.0.

Supplementary European search report dated Jul. 11, 2024 received in European Patent Application No. 22902646.3.

Written Opinion dated Jul. 28, 2022 received in international Application No. PCT/CN2022/080955.

European Examination Report dated Oct. 28, 2025 received in European Application No. 22902646.3.

* cited by examiner

HOUSING ASSEMBLY, COMPRESSOR, AND AIR CONDITIONER

CROSS-REFERENCE TO RELATED APPLICATIONS

This application is a continuation application of International Application No. PCT/CN2022/080955, filed on Mar. 15, 2022, which claims priorities to Chinese Patent Application No. 202111499444.0, entitled "HOUSING ASSEMBLY, COMPRESSOR, AND AIR CONDITIONER" and filed on Dec. 9, 2021, and Chinese Patent Application No. 202123086550.4, entitled "HOUSING ASSEMBLY, COMPRESSOR, AND AIR CONDITIONER" and filed on Dec. 9, 2021, the entire contents of each of which are hereby incorporated by reference for all purposes. No new matter has been introduced.

FIELD

The present disclosure relates to the field of compressor technologies, and more particularly, to a housing assembly, a compressor, and an air conditioner.

BACKGROUND

The compressor is an important part of an air conditioner, and compresses and drives compression and driving of a refrigerant in a refrigerant loop. Usually, the compressor is mounted in an outdoor unit of the air conditioner. The compressor extracts a refrigerant from a low-pressure region, compresses the refrigerant, and conveys the refrigerant to a condenser. Heat is dissipated through the condenser, causing the refrigerant to change from a gaseous state to a liquid state.

In the related art, a temperature sensor is disposed on a compressor of an outdoor unit of the air conditioner. However, due to a weak mounting structure of the temperature sensor, the temperature sensor is prone to loosening, leading to distortion of detected temperature data. In this way, when an electronic control system of the air conditioner controls the compressor based on the temperature data detected by the temperature sensor, a protection action may fail to be made in time, resulting in failures, such as, wear of a pump body of the compressor and demagnetization of a motor.

SUMMARY

The present disclosure aims to solve at least one of the technical problems in the related art. To this end, the present disclosure provides a housing assembly capable of effectively fixing a temperature sensor to accurately detect a housing temperature of a compressor, which facilitates accurate control of an operation of the compressor.

The present disclosure further provides a compressor and an air conditioner that use the above-mentioned housing assembly.

According to one embodiment of the present disclosure, a housing assembly is provided. The housing assembly can be applied in a compressor. The housing assembly includes a housing, a temperature sensor, and a fixing bracket. The temperature sensor abuts an outer wall of the housing. The fixing bracket includes a fixing portion and connection portions located on two sides of the fixing portion. The connection portions are fixedly connected to the housing. A mounting cavity is formed between the fixing portion and the housing. The temperature sensor is located in the mounting cavity. The fixing portion includes a top plate and side plates connected to two sides of the top plate. An angle formed between the top plate and each of the side plates is an obtuse angle. Each of the top plate and the side plates abuts the temperature sensor.

The housing assembly according to the embodiment of the present disclosure can at least provide the following advantageous effects. The fixing bracket is mounted to the housing through the connection portions. The temperature sensor is mounted in the mounting cavity between the fixing portion and the housing, and is limited by the fixing portion. The top plate and two side plates of the fixing portion form a trapezoidal shape. The top plate abuts the temperature sensor from a top, enabling the temperature sensor to remain in contact with the outer wall of the housing. The side plates on the two sides exert pressure on the temperature sensor from the two sides, further enabling the temperature sensor to remain in contact with the outer wall of the housing, eliminating defects of the temperature sensor being loose and falling off. The temperature sensor can effectively detect the housing temperature of the compressor, which helps to precisely control an operation state of the compressor.

According to some embodiments of the present disclosure, the fixing portion has an inlet end to allow the temperature sensor to be mounted in the mounting cavity. The inlet end is provided with an arc-shaped protrusion facing towards the temperature sensor. The arc-shaped protrusion abuts the temperature sensor.

According to some embodiments of the present disclosure, in an axial direction of the temperature sensor, the mounting cavity is gradually tapered in a direction facing away from the inlet end.

According to some embodiments of the present disclosure, the side plates include two side plates. A distance between the two side plates gradually decreases in a direction facing away from the inlet end.

According to some embodiments of the present disclosure, a distance between the top plate and the housing gradually decreases in a direction facing away from the inlet end.

According to some embodiments of the present disclosure, each of a width and a height of an end of the mounting cavity facing away from the inlet end is smaller than a diameter of the temperature sensor.

According to some embodiments of the present disclosure, the inlet end has a flared opening having a width greater than a diameter of the temperature sensor.

According to some embodiments of the present disclosure, a heat-sensitive sleeve is sleeved on the temperature sensor. An outer diameter of the heat-sensitive sleeve is greater than the width of the flared opening.

According to some embodiments of the present disclosure, a length of the fixing portion is smaller than an effective temperature-sensing length of the temperature sensor in the axial direction of the temperature sensor.

According to some embodiments of the present disclosure, a pressing sheet is disposed at an end of each of the side plates facing away from the inlet end. The pressing sheet extends in the axial direction of the temperature sensor.

According to some embodiments of the present disclosure, a weld is disposed on each of the connection portions. The connection portion is welded to the housing through the weld.

According to one embodiment of the present disclosure, a compressor is provided. The compressor includes the housing assembly according to the above-mentioned embodiments. The temperature sensor is limited by the fixing bracket through the fixing portion. The top plate and two side plates of the fixing portion form a trapezoidal shape. The top plate abuts the temperature sensor from a top, enabling the temperature sensor to remain in contact with the outer wall of the housing. The side plates on the two sides exert pressure on the temperature sensor from the two sides, further enabling the temperature sensor to remain in contact with the outer wall of the housing, eliminating defects of the temperature sensor being looseness and falling off. The temperature sensor can effectively detect the housing temperature of the compressor, which helps to precisely control an operation state of the compressor.

According to one embodiment of the present disclosure, an air conditioner is provided. The air conditioner includes the compressor according to the above-mentioned embodiments.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

Additional aspects and advantages of the present disclosure will become more apparent and more understandable from the following description of embodiments taken in conjunction with the accompanying drawings.

Figure 1:
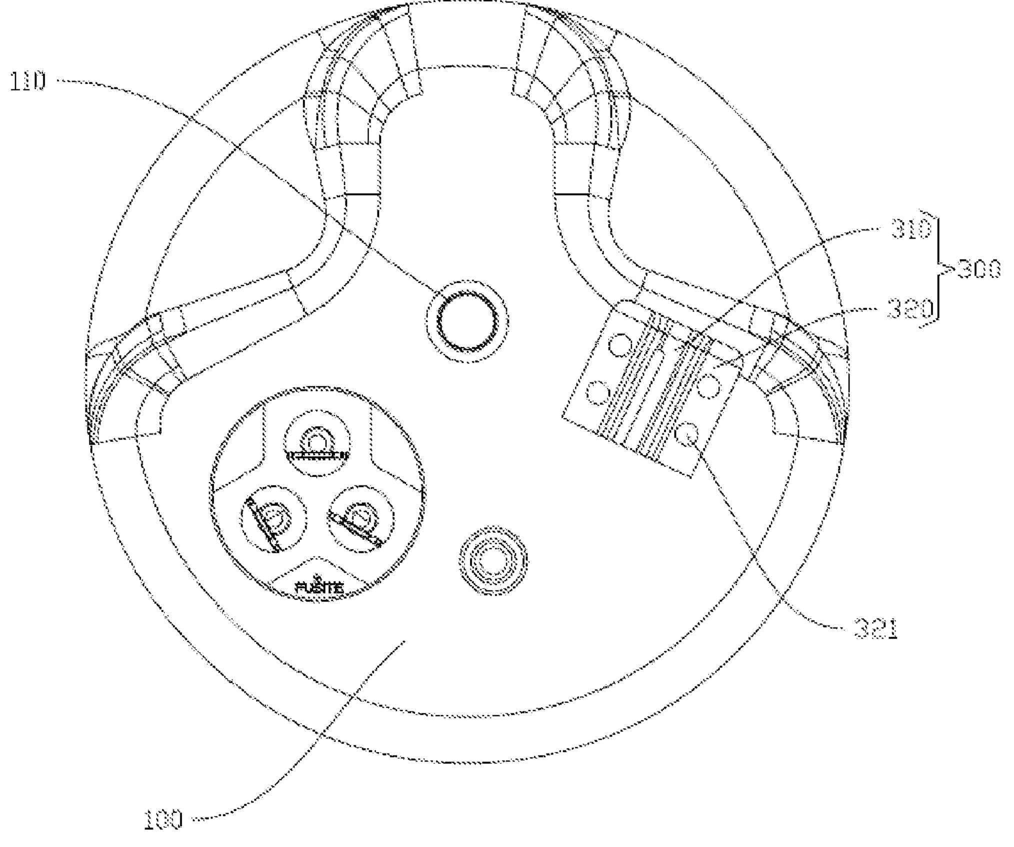
FIG. 1 is a schematic structural view of a housing connected to a fixing bracket according to some embodiments of the present disclosure.

REFERENCE NUMERALS OF THE ACCOMPANYING DRAWINGS housing 100, exhaust pipe 110;
temperature sensor 200, heat-sensitive sleeve 210;
fixing bracket 300, mounting cavity 301, fixing portion 310, top plate 311, arc-shaped protrusion 3111, side plate 312, flared opening 313, pressing sheet 314, connection portion 320, weld 321.

DETAILED DESCRIPTION OF EMBODIMENTS

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the embodiments of the present disclosure.

In the description of the present disclosure, it should be understood that the orientation or position relationship indicated by description related to orientations such as upper, lower, front, rear, left, and right is based on the orientation or position relationship shown in the drawings, and is only for the convenience of describing the present disclosure and simplifying the description, rather than indicating or implying that the pointed device or element must have an exemplary orientation, or be constructed and operated in an exemplary orientation, and therefore cannot be understood as a limitation of the present disclosure.

In the description of the present disclosure, description associated with first and second is used only for the purpose of distinguishing technical features and cannot be understood as indicating or implying relative importance or implicitly indicating the number of indicated technical features or implicitly specifying a sequence of the indicated technical features.

In the description of the present disclosure, unless otherwise clearly limited, terms such as dispose, install, connect and the like should be understood in a broad sense. For those skilled in the art, the exemplary meaning of the above-mentioned terms in the present disclosure can be understood properly according to exemplary contents of technical solutions.

The air conditioner is an air regulator, which is a device that uses artificial means to regulate and control the temperature, humidity, flow rate, and other parameters of ambient air in a building. Generally, the air conditioner includes several parts of a cold source/heat source device, a hot and cold medium distribution system and an end device, and other auxiliary devices. A refrigeration host, a water pump, a fan, and a piping system are mainly included. The end device is responsible for dealing with a state of the air as desired using distributed cold and heat, to achieve a determined target of an air parameter of a target environment.

In the related art, most air conditioners use a compressor as a power source for a refrigerant. The compressor is a fluid machine that changes a low-pressure gas into a high-pressure gas. The compressor is configured to take in a low-temperature and low-pressure refrigerant gas from a suction pipe, compress the low-temperature and low-pressure refrigerant gas to output a high-temperature and high-pressure refrigerant gas, and further provide power for a circulation of the refrigerant, realizing a refrigeration cycle of compression→condensation (heat release)→expansion→evaporation (heat absorption).

To avoid failures, such as, wear of a pump body of the compressor and demagnetization of a motor due to an overrun of operating temperature of the compressor, an electronic control system of the air conditioner usually controls the compressor based on temperature data. The temperature data comes from a temperature sensor disposed on an outer wall of the compressor. However, due to a weak mounting structure of the temperature sensor, the temperature sensor is prone to loosening, which leads to distorted data of a temperature measurement, and is not conducive to protecting the compressor.

As illustrated in FIG. 1 to FIG. 4, according to one embodiment of the present disclosure, a housing assembly, which is applicable in a compressor, is provided. The compressor usually has a closed housing 100. A motor and a compressor mechanism are both disposed in the housing 100. An exhaust pipe 110 of the compressor is disposed on the housing 100. A compressed high-temperature and high-pressure refrigerant gas is discharged from the exhaust pipe 110.

Figure 8:
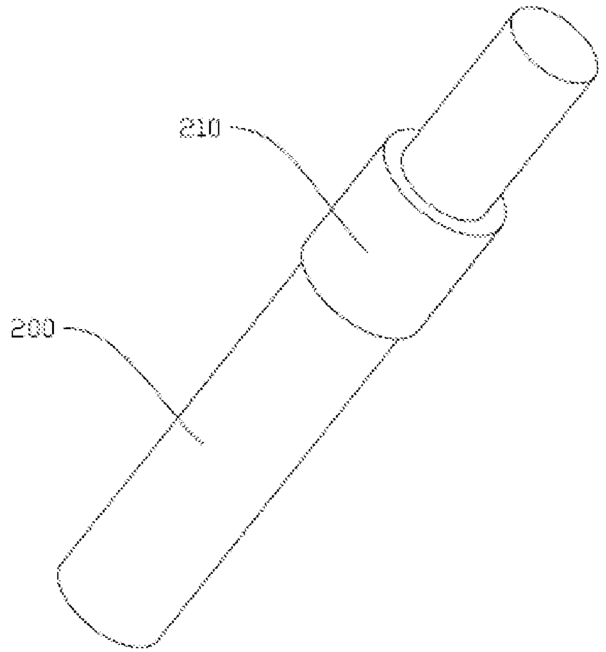
FIG. 8 is a schematic structural view of a temperature sensor according to some embodiments of the present disclosure.

It should be understood that, a temperature sensor 200 is disposed on an outer wall of the housing 100 to accurately detect a temperature of the housing 100, thereby monitoring an operation state of the compressor. As illustrated in FIG. 8, the temperature sensor 200 has a columnar shape. The temperature sensor 200 needs to be tightly attached to the outer wall of housing 100, which can accurately measure the temperature of the housing 100. Thus, a fixing bracket 300 is connected to the housing 100 to limit the temperature sensor 200.

Figure 2:
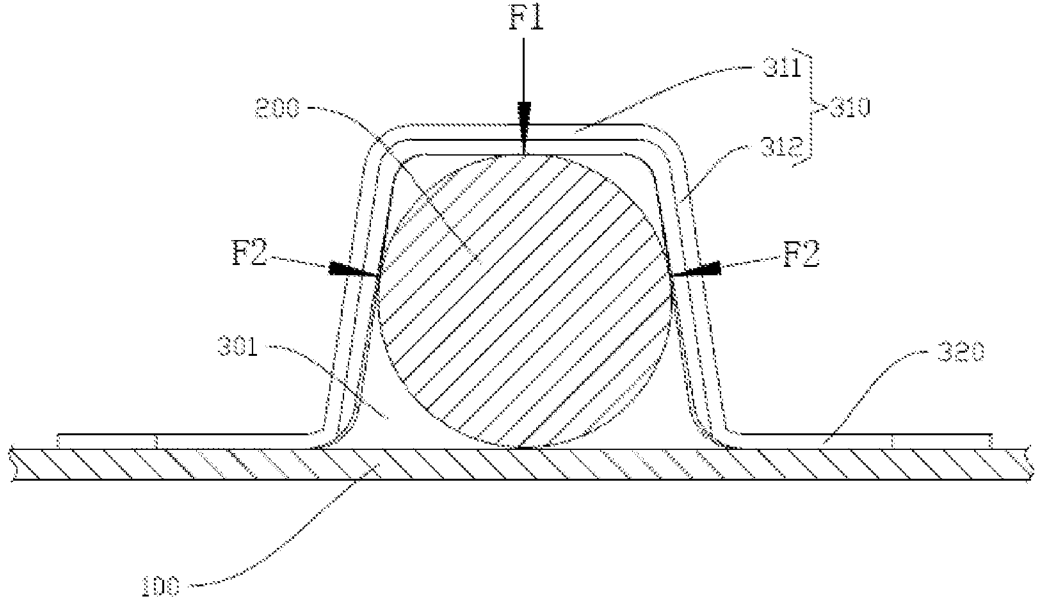
FIG. 2 is a cross-sectional view of a housing assembly according to some embodiments of the present disclosure.

As illustrated in FIG. 2, the fixing bracket 300 includes a fixing portion 310 that covers the temperature sensor 200 and connection portions 320. The connection portions 320 are configured to be fixedly connected to the housing 100. Two connection portions 320 are provided and located on two sides of the fixing portion 310, which realizes a fixed relative position between the fixing portion 310 and the housing 100.

The fixing portion 310 includes a top plate 311 and two side plates 312 arranged on two sides of the top plate 311. That is, each side plate 312 is formed as a connection structure between the top plate 311 and the corresponding connection portion 320. Each of the two side plates 312 is arranged in a tilted manner. An obtuse angle is formed between the side plate 312 and the top plate 311. It should be understood that the top plate 311 and the two side plates 312 resemble three sides of a trapezoid. A mounting cavity 301 is defined by the top plate 311, the two side plates 312, and the housing 100.

During assembly, the temperature sensor 200 is inserted in the mounting cavity 301. The temperature sensor 200 is in contact with the top plate 311, the two side plates 312, and the housing 100 simultaneously. Each of the two side plates 312 is in contact with the temperature sensor 200 at a position higher than an axis of the temperature sensor 200. As illustrated in FIG. 2, all of the top plate 311 and the two side plates 312 of the fixing portion 310 exert pressure on the temperature sensor 200. A force F1 exerted by the top plate 311 is directed towards the housing 100 to enable the temperature sensor 200 to be tightly attached to the outer wall of the housing 100, while forces F2 exerted by the two side plates 312 are symmetrical. A resultant force of the two forces F2 is also directed towards the housing 100, which similarly enables the temperature sensor 200 to be tightly attached to the outer wall of the housing 100. The temperature sensor 200 is kept in close contact with the housing 100 through limitations imposed by the top plate 311 and the two side plates 312 on the temperature sensor 200, which allows the temperature sensor 200 to effectively measure the temperature of the housing 100. Measurement data of the temperature sensor 200 is accurate and reliable. The fixing bracket 300 according to the embodiments of the present disclosure eliminates a defect of looseness of the temperature sensor 200 and ensures that the temperature sensor 200 accurately detects the temperature of the housing 100. The temperature sensor 200 can provide real-time feedback on the temperature of the housing 100, which helps to accurately control an operation of the compressor, prevents the compressor from exceeding the operating temperature, and avoids failures, such as, the wear of the pump body and the demagnetization of the motor.

It should be understood that, as illustrated in FIG. 1, since the exhaust pipe 110 is configured to discharge the high-temperature and high-pressure refrigerant gas, a position where the exhaust pipe 110 is located is at a high temperature. Disposing a connection between the temperature sensor 200 and the housing 100 at a position adjacent to the exhaust pipe 110 can detect data more accurately, which helps to protect the compressor.

It should be understood that the fixing portion 310 is elastic and can be configured to position the temperature sensor 200. The fixing portion 310 may be made of an elastic material, such as, a copper alloy, or may have an elastically deformable structure, as long as the fixing portion 310 can limit the temperature sensor 200.

Figure 5:
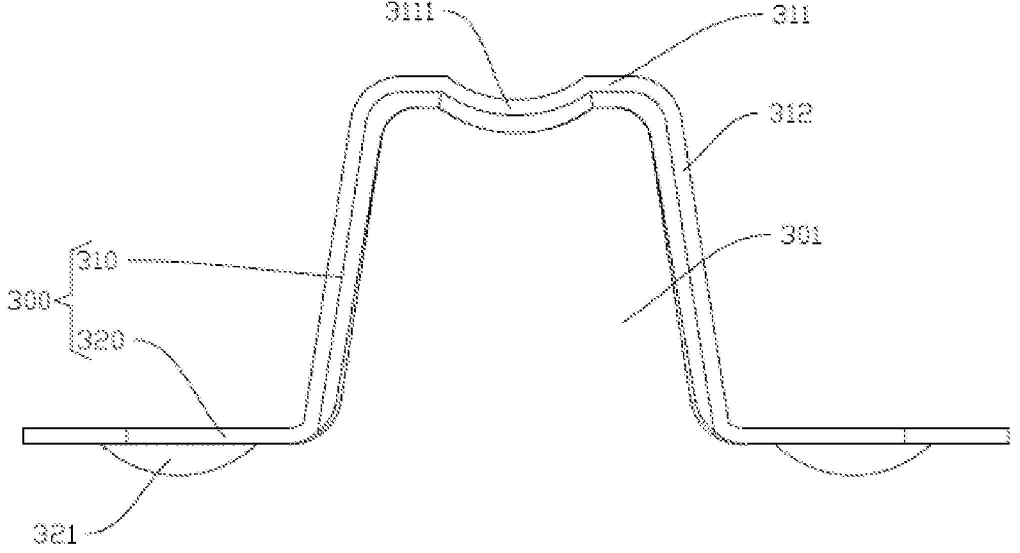
FIG. 5 is a front view of a fixing bracket according to some further embodiments of the present disclosure.
Figure 6:
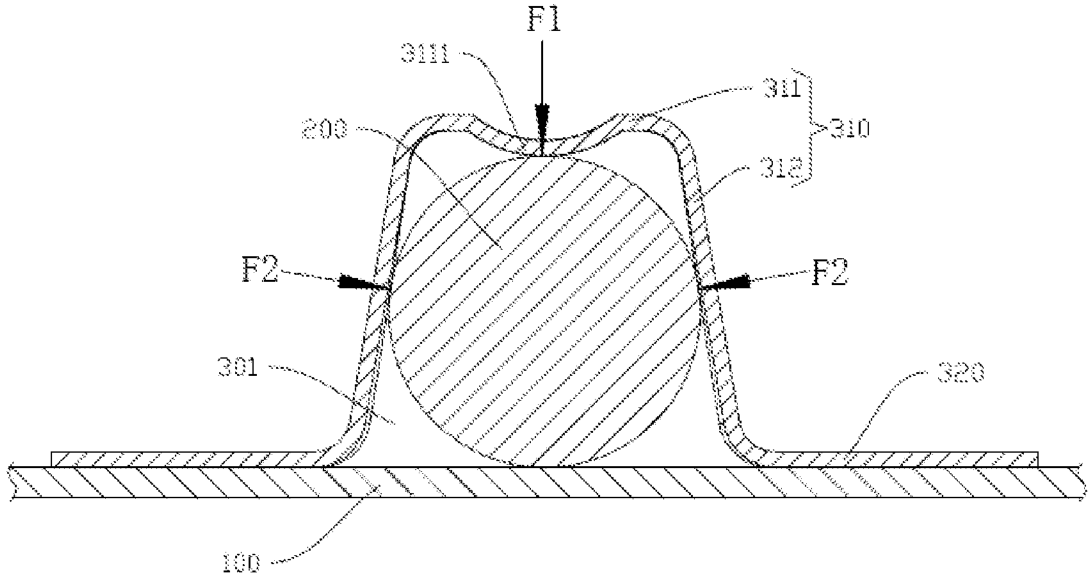
FIG. 6 is a cross-sectional view of a housing assembly according to some further embodiments of the present disclosure.
Figure 7:
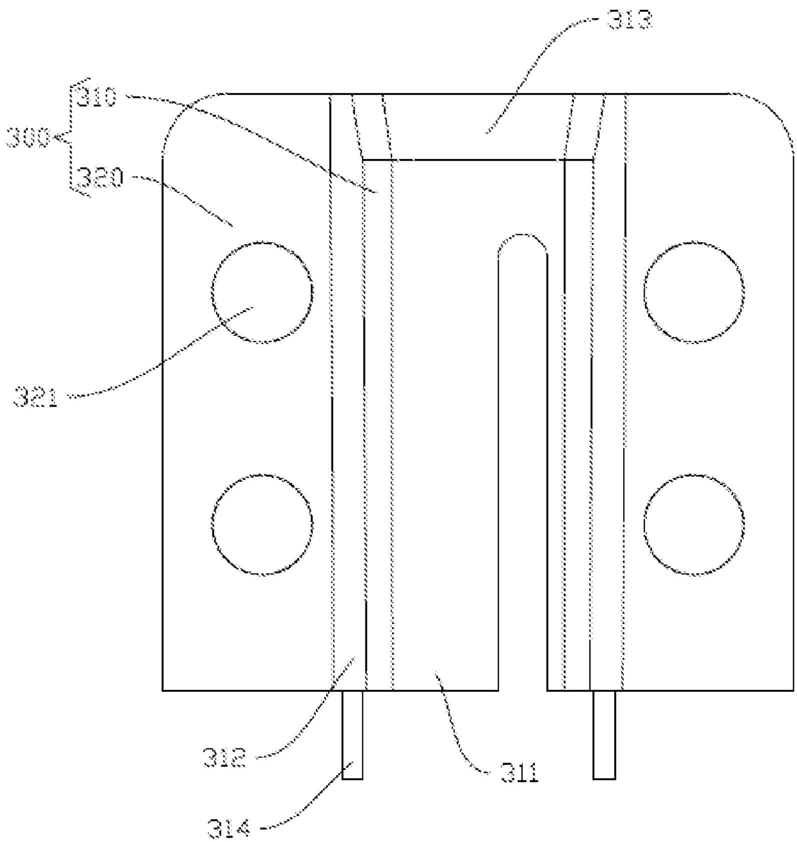
FIG. 7 is a top view of a fixing bracket according to some further embodiments of the present disclosure.

It should be understood that an end of the fixing bracket 300 into which the temperature sensor 200 is mounted is defined as an inlet end. The temperature sensor 200 is inserted in the mounting cavity 301 from the inlet end. Usually, the inlet end has a large cross-sectional area to facilitate mounting of the temperature sensor 200. As illustrated in FIGS. 5 and 6, to provide a sufficient limitation, an arc-shaped protrusion 3111 may be formed on the top plate 311 at the inlet end. As illustrated in FIG. 6, the arc-shaped protrusion 3111 is an arc-shaped raised structure and faces towards the mounting cavity 301. When the temperature sensor 200 is mounted in the mounting cavity 301, the arc-shaped protrusion 3111 abuts a top surface of the temperature sensor 200. It should be understood that the arc-shaped protrusion 3111 is automatically elastic and produces a small elastic deformation when in contact with the temperature sensor 200. According to the principle of reaction force, the arc-shaped protrusion 3111 exerts a force facing towards the housing 100 on the temperature sensor 200, which prompts the temperature sensor 200 to be tightly attached to the outer wall of the housing 100.

It should be understood that, the arc-shaped protrusion 3111 may be disposed at the inlet end only, or the arc-shaped protrusion 3111 may extend in an axial direction of the temperature sensor 200, or a plurality of arc-shaped protrusions 3111 may be disposed on the top plate 311 in the axial direction of the temperature sensor 200. All of these examples can meet a requirement of limiting the temperature sensor 200.

It should be understood that the mounting cavity 301 may be formed in a tapered shape. That is, in the axial direction of the temperature sensor 200, the mounting cavity 301 is gradually tapered. The inlet end is located at a large size end to facilitate mounting of the temperature sensor 200. A size of the large size end of the mounting cavity 301 may be set to be greater than a size of the temperature sensor 200, while a size of a small size end of the mounting cavity 301 may be set to be smaller than that of the temperature sensor 200. Considering that the top plate 311 and the two side plates 312 resemble three sides of a trapezoid, a cross section of the mounting cavity 301 is similar to a trapezoid. Thus, a width of the small size end of the mounting cavity 301 may be smaller than a diameter of the temperature sensor 200, or a height of the small size end of the mounting cavity 301 may be smaller than the diameter of the temperature sensor 200, or both the width and the height of the small size end of the mounting cavity 301 may be smaller than the diameter of the temperature sensor 200, as long as the temperature sensor 200 may be limited by an elastic deformation of the fixing portion 310. When the temperature sensor 200 is mounted in the mounting cavity 301, the temperature sensor 200 is limited by the gradually-tapered mounting cavity 301, and the fixing portion 310 exerts pressure on the temperature sensor 200 to enable the temperature sensor 200 to be tightly attached to the outer wall of the housing 100, in such a manner that the temperature sensor 200 is tightly attached to the housing 100, allowing the temperature of the housing 100 to be accurately measured in real time. In addition, the small size end of the mounting cavity 301 can prevent the temperature sensor 200 from passing through the mounting cavity 301, which facilitates accurate positioning.

It should be understood that the small size end of the mounting cavity 301 may also be set to match a cross-sectional area of the temperature sensor 200. The temperature sensor 200 may be completely placed in the mounting cavity 301, or the temperature sensor 200 may partially extend out of the mounting cavity 301. The temperature sensor 200 is limited by the fixing portion 310 to keep abutting the housing 100, thus the temperature of the housing 100 can be detected accurately in real time.

It should be understood that the small size end of the mounting cavity 301 may also be set to be slightly greater than the temperature sensor 200 to allow the temperature sensor 200 to partially extend out of the mounting cavity 301.

It should be understood that a structure of the top plate 311 arranged in a tilted manner is used to achieve gradual tapering of the mounting cavity 301. In the axial direction of the temperature sensor 200, the top plate 311 is tilted towards the housing 100 in a direction facing away from the inlet end. That is, a distance between the top plate 311 and the housing 100 gradually decreases, making the mounting cavity 301 present a gradually-tapered structure. In addition, the tilted top plate 311 exerts, on the temperature sensor 200, a force facing towards the housing 100, prompting the temperature sensor 200 to be tightly attached to the outer wall of the housing 100.

It should be understood that a structure used to achieve gradual tapering of the mounting cavity 301 is that the two side plates 312 gradually approach each other. In the axial direction of the temperature sensor 200, a distance between the two side plates 312 gradually decreases in the direction facing away from the inlet end, making the mounting cavity 301 present a gradually-tapered structure. In addition, with the above structure, the two side plates 312 exert a greater force on the temperature sensor 200, which helps to induce the temperature sensor 200 to be tightly attached to the outer wall of the housing 100. In addition, the two side plates 312 further cooperate to clamp the temperature sensor 200, which prevents the temperature sensor 200 from escaping from the mounting cavity 301.

The top plate 311 arranged in the tilted manner and the two side plates 312 gradually approaching each other may be adopted simultaneously, to achieve the gradual tapering of the mounting cavity 301. When the temperature sensor 200 is mounted in the mounting cavity 301, all of the top plate 311 and the two side plates 312 apply pressure to the temperature sensor 200 to enable the temperature sensor 200 to be tightly attached to the outer wall of the housing 100. In addition, the two side plates 312 further cooperate to clamp the temperature sensor 200, which prevents the temperature sensor 200 from escaping from the mounting cavity 301.

Figure 3:
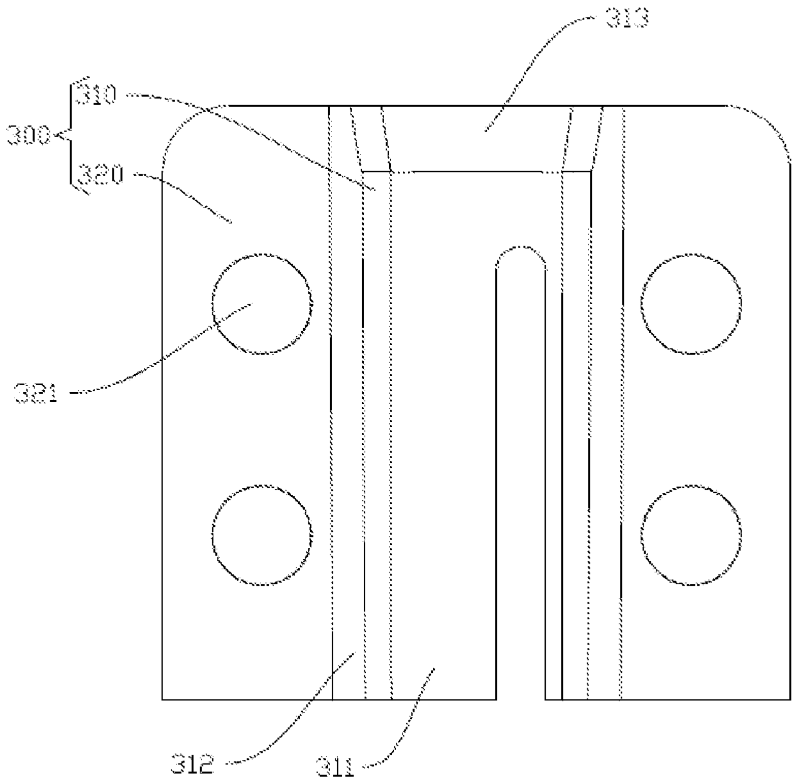
FIG. 3 is a top view of a fixing bracket according to some embodiments of the present disclosure.

As illustrated in FIG. 3, it should be understood that a flared opening 313 is formed on the fixing bracket 300. A cross section of the flared opening 313 is greater than a cross section of the temperature sensor 200. The flared opening 313 is the inlet end and formed as an inlet of the mounting cavity 301. That is, the temperature sensor 200 is mounted in the mounting cavity 301 from the flared opening 313. The flared opening 313 is configured to enlarge a space for entry to facilitate mounting of the temperature sensor 200. In addition, an inner wall surface of the flared opening 313 has a horn shape, which can facilitate the centering of the temperature sensor 200 to enable the temperature sensor 200 to enter the mounting cavity 301 accurately, improving a mounting efficiency.

It should be understood that, considering that the fixing bracket 300 is configured to fix the temperature sensor 200 and that the fixing portion 310 needs to apply pressure to the temperature sensor 200 to prompt the temperature sensor 200 to be in contact with the outer wall of the housing 100, a length occupied by the flared opening 313 in the axial direction of the temperature sensor 200 is set to be smaller than one-third of a length of the fixing bracket 300. In some embodiments, the length of the flared opening 313 is one-tenth of the length of the fixing bracket 300, which enables nine-tenths of a length of the fixing portion 310 to exert pressure on the temperature sensor 200. Thus, the pressure is sufficient to limit the temperature sensor 200.

It should be understood that a length of an effective temperature-sensing region of the temperature sensor 200 in an axial direction is an effective temperature-sensing length. The effective temperature-sensing length is fixed. Setting the length of the fixing portion 310 to be smaller than the effective temperature-sensing length is conducive to observing whether the temperature sensor 200 is in close contact with the housing 100 and reduces a resistance during the assembly.

As illustrated in FIG. 8, it should be understood that a heat-sensitive sleeve 210 is usually sleeved on the temperature sensor 200. Considering that a position where the temperature sensor 200 is mounted in the mounting cavity 301 needs to be accurately positioned, the cross section of the flared opening 313 is set to be smaller than a cross section of the heat-sensitive sleeve 210. That is, the heat-sensitive sleeve 210 is kept out of the flared opening 313 to provide a position limitation. During the assembly of the temperature sensor 200, the heat-sensitive sleeve 210 abuts the flared opening 313 to provide position positioning of the heat-sensitive sleeve 210, accurately defining a mounting depth of the temperature sensor 200.

It should be understood that, to define the length of the temperature sensor 200 mounted in the mounting cavity 301, other structural forms may be used. For example, an end of the fixing bracket 300 opposite to the flared opening 313 may be formed as a closed structure. When the temperature sensor 200 is mounted in the mounting cavity 301, the temperature sensor 200 may be directly inserted at a bottom of the mounting cavity 301, which is simple and convenient.

Alternatively, a position limiting structure, such as, a position limiting ring may be disposed on an inner wall of the fixing portion 310. The temperature sensor 200 is mounted in the mounting cavity 301, until the temperature sensor 200 abuts the position limiting ring.

Alternatively, a pressing sheet 314 is disposed at an end of the side plate 312 facing away from the flared opening 313. The pressing sheet 314 extends in the axial direction of the temperature sensor 200. When the temperature sensor 200 is mounted in the mounting cavity 301, whether the temperature sensor 200 is mounted in place may be determined through observing relative positions of the temperature sensor 200 and the pressing sheet 314. Two pressing sheets 314 may also apply clamping forces to the temperature sensor 200 to fix the temperature sensor 200, preventing the temperature sensor 200 from escaping from the mounting cavity 301.

Figure 4:
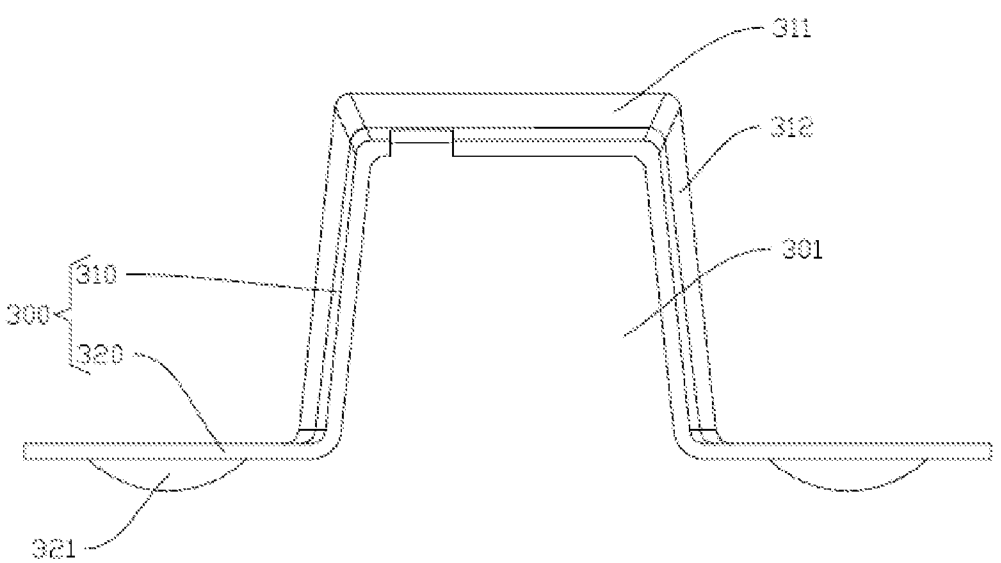
FIG. 4 is a front view of the fixing bracket in FIG. 3.

As illustrated in FIG. 3, it should be understood that, two welds 321 are arranged on each connection portion 320, and a total of four welds 321 are on the fixing bracket 300. The welds are configured to cooperate with the housing 100 to realize welding. The welding is realized in a method of resistance welding to fix the connection portions 320 on the outer wall of the housing 100. The resistance welding is a method of welding by using resistance heat, which is generated when a current passes through a weldment and a contact position, as a heat source to heat the weldment locally, and heating a workpiece to a molten or plastic state at a contact surface of the workpiece and an adjacent region while applying pressure. During welding, no filler metal is required, leading to high productivity, small deformation of the weldment, and easy automation. To accurately define a region to be welded, two welds 321 are arranged on each connection portion 320. As illustrated in FIG. 4, the weld 321 is a protrusion facing towards the housing 100. The weld used in conjunction with the resistance welding process can improve a welding efficiency.

It should be understood that the connection portions 320 may also be mounted on the housing 100 through fixtures. For example, the connection portions 320 are fixedly connected to the housing 100 through screws. The connection portions 320 may also be adhered to the housing 100 through glue to achieve fixation.

According to one embodiment of the present disclosure, a compressor is provided. The compressor includes the housing assembly according to the above-mentioned embodiments. The fixing bracket 300 is connected to the housing 100 of the compressor. The fixing portion 310 of the fixing bracket 300 includes the top plate 311 and the two side plates 312. The two side plates 312 are arranged on two sides of the top plate 311. Each of the two side plates 312 is arranged in a tilted manner. An obtuse angle is formed between the side plate 312 and the top plate 311. It should be understood that the top plate 311 and the two side plates 312 resemble three sides of a trapezoid, enabling the mounting cavity 301 defined by the top plate 311, the two side plates 312, and the housing 100 to have a trapezoidal cross section.

During assembly, the temperature sensor 200 is inserted in the mounting cavity 301. The temperature sensor 200 is in contact with the top plate 311, the two side plates 312, and the housing 100 simultaneously. Each of the two side plates 312 is in contact with the temperature sensor 200 at the position higher than the axis of the temperature sensor 200. As illustrated in FIG. 2, all of the top plate 311 and the two side plates 312 of the fixing portion 310 exert pressure on the temperature sensor 200. The force F1 exerted by the top plate 311 is directed towards the housing 100 to enable the temperature sensor 200 to be tightly attached to the outer wall of the housing 100, while the forces F2 exerted by the two side plates 312 are symmetrical. The resultant force of the two forces F2 is also directed towards the housing 100, which similarly enables the temperature sensor 200 to be tightly attached to the outer wall of the housing 100. The temperature sensor 200 is kept in close contact with the housing 100 through limitations imposed by the top plate 311 and the two side plates 312 on the temperature sensor 200, which allows the temperature sensor 200 to effectively measure the temperature of the housing 100. The measurement data of the temperature sensor 200 is accurate and reliable. The fixing bracket 300 according to the embodiments of the present disclosure eliminates the defect of looseness of the temperature sensor 200 and ensures that the temperature sensor 200 accurately detects the temperature of the housing 100. The temperature sensor 200 can provide real-time feedback on the temperature of the housing 100, which helps to accurately control the operation of the compressor, prevents the compressor from exceeding the operating temperature, and avoids failures, such as, the wear of the pump body and the demagnetization of the motor.

According to one embodiment of the present disclosure, an air conditioner is provided. The air conditioner includes the compressor according to the above-mentioned embodiments. The air conditioner adopts all the technical solutions of the compressor and can provide all the technical effects of the compressor, thus details thereof will be omitted here.

The embodiments of the present disclosure are described in detail above in conjunction with the accompanying drawings, but the present disclosure is not limited to the above embodiments. Various variations can be made within the scope of knowledge possessed by those skilled in the art, without departing from the spirit of the present disclosure.

What is claimed is:

1. A housing assembly comprising:
- a housing;
- a temperature sensor abutting an outer wall of the housing; and
- a fixing bracket comprising a fixing portion and connection portions located on two sides of the fixing portion, wherein:
  - the connection portions is fixedly connected to the housing;
  - a mounting cavity is formed between the fixing portion and the housing;
  - the temperature sensor is located in the mounting cavity;
  - the fixing portion comprises a top plate and side plates connected to two sides of the top plate;
  - an angle formed between the top plate and each of the side plates is an obtuse angle;
  - each of the top plate and the side plates abuts the temperature sensor and each of the side plates is in contact with the temperature sensor at a position, relative to the housing, higher than a longitudinal axis of the temperature sensor, relative to the housing; and
  - the fixing portion has an inlet end to allow the temperature sensor to be mounted in the mounting cavity and each of the side plates includes an individual pressing sheet disposed at an end of each of the side plates facing away from the inlet end, each individual pressing sheet extending in an axial direction of the temperature sensor.

2. The housing assembly according to claim 1, wherein:
- the inlet end is provided with an arc-shaped protrusion facing towards the temperature sensor, and
- the arc-shaped protrusion abuts the temperature sensor.

3. The housing assembly according to claim 2, wherein in an axial direction of the temperature sensor, the mounting cavity is tapered in a direction facing away from the inlet end.

4. The housing assembly according to claim 2, wherein the side plates comprise two side plates, a distance between the two side plates decreasing in a direction facing away from the inlet end.

5. The housing assembly according to claim 2, wherein a distance between the top plate and the housing decreases in a direction facing away from the inlet end.

6. The housing assembly according to claim 3, wherein each of a width and a height of an end of the mounting cavity facing away from the inlet end is smaller than a diameter of the temperature sensor.

7. The housing assembly according to claim 4, wherein each of a width and a height of an end of the mounting cavity facing away from the inlet end is smaller than a diameter of the temperature sensor.

8. The housing assembly according to claim 5, wherein each of a width and a height of an end of the mounting cavity facing away from the inlet end is smaller than a diameter of the temperature sensor.

9. The housing assembly according to claim 3, wherein the inlet end has a flared opening having a width greater than a diameter of the temperature sensor.

10. The housing assembly according to claim 4, wherein the inlet end has a flared opening having a width greater than a diameter of the temperature sensor.

11. The housing assembly according to claim 5, wherein the inlet end has a flared opening having a width greater than a diameter of the temperature sensor.

12. The housing assembly according to claim 9, wherein a heat-sensitive sleeve is sleeved on the temperature sensor, an outer diameter of the heat-sensitive sleeve being greater than the width of the flared opening.

13. The housing assembly according to claim 12, wherein a length of the fixing portion is smaller than an effective temperature-sensing length of the temperature sensor in the axial direction of the temperature sensor.

14. The housing assembly according to claim 1, wherein a weld is disposed on each of the connection portions, the connection portion being welded to the housing through the weld.

15. A compressor comprising the housing assembly according to claim 1.

16. An air conditioner comprising the compressor according to claim 15.

* * * * *